(12) United States Patent
Tatewaki et al.

(10) Patent No.: US 7,527,120 B2
(45) Date of Patent: May 5, 2009

(54) MOTORCYCLE

(75) Inventors: Takefumi Tatewaki, Saitama (JP); Atsushi Hatayama, Saitama (JP); Mami Anno, Saitama (JP); Kazuhiko Mori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 909 days.

(21) Appl. No.: 10/961,032

(22) Filed: Oct. 12, 2004

(65) Prior Publication Data

US 2005/0103144 A1 May 19, 2005

(30) Foreign Application Priority Data

Oct. 14, 2003 (JP) .............................. 2003-354244

(51) Int. Cl.
*B60K 1/00* (2006.01)
*B62M 25/04* (2006.01)

(52) U.S. Cl. .......................... 180/230; 180/338; 701/52

(58) Field of Classification Search ................. 180/219, 180/338; 701/52
See application file for complete search history.

(56) References Cited

FOREIGN PATENT DOCUMENTS

| CN | 1186036 A | 7/1998 |
|---|---|---|
| CN | 1342586 A | 4/2002 |
| EP | 0 849 158 A1 | 6/1998 |
| EP | 1 184 603 A2 | 3/2002 |
| EP | 1 188 661 A2 | 3/2002 |
| JP | 62-155192 A | 10/1987 |
| JP | 2002-357269 A | 12/2002 |

*Primary Examiner*—Paul N Dickson
*Assistant Examiner*—Marc A Scharich
(74) *Attorney, Agent, or Firm*—Birch, Stewart, Kolasch & Birch, LLP

(57) ABSTRACT

To simplify the switching between an automatic shift mode and a manual shift mode in a CVT. A selector switch is included in a switch unit provided on a handle bar at a position near a right grip and a shift switch is included in a switch unit provided on the handle bar at a position near a left grip. When the manual shift mode is selected, the shift switch functions as a shift control switch, whereas when the automatic shift mode is selected by the selector switch, mode selection for selecting any one of a first drive mode and a second drive mode, for example, can be made by the shift switch.

22 Claims, 14 Drawing Sheets

MOTORCYCLE

CROSS-REFERENCE TO RELATED APPLICATIONS

The present application claims priority under 35 USC 119 to Japanese Patent Application No. 2003-354244 filed on Oct. 14, 2003 the entire contents of which are hereby incorporated by reference.

BACKGROUND OF THE INVENTION

1. Field of the Invention

The present invention relates to a motorcycle. More particularly to a motorcycle having switches for operating a transmission, wherein the switches are arranged so that the transmission can be efficiently operated.

2. Description of Background Art

A V-belt type continuously variable transmission (CVT) is known that includes a drive pulley, a driven pulley and a V-belt wrapped between the drive pulley and the driven pulley. The drive pulley is connected to a prime mover such as an engine and the driven pulley is connected to a load. The wrapping radius of the V-belt on the drive pulley and the wrapping radius of the V-belt on the driven pulley are continuously varied to control a speed ratio. More particularly, it is known that a vehicle including a CVT includes a plurality of shift modes. For example, in a transmission control device described in Japanese Patent Laid-open No. Sho 62-155192, an economy mode, a standard mode or a power mode can be selected by a control switch provided in the vicinity of a handle grip. FIG. 16 shows such a prior art configuration wherein a control switch for switching among a plurality of shift modes is provided in the vicinity of a handle grip. As illustrated in FIG. 16, a switch unit 116 is provided in the vicinity of a handle grip 115. The switch unit 116 includes a control switch 117 in combination with a self starter switch 118 and a headlight switch 119.

Japanese Patent Laid-open No. 2002-357269 discloses a transmission for a motor-driven vehicle having an automatic shift mode and a manual shift mode. This transmission is provided with a selector switch for selecting either the automatic shift mode or the manual shift mode and is also provided with a shift-up switch and a shift-down switch for use in the manual shift mode.

It is desirable to select any one of a plurality of automatic shift modes and a manual shift mode as a function which is lacking in the above prior art devices. However, it is necessary to provide a switch for switching among the plurality of automatic shift modes, a switch for switching between the automatic shift mode and the manual shift mode and a switch for shift-down and shift-up in the manual shift mode. In a motorcycle, switches are generally arranged in the periphery of a handle bar as shown in Japanese Patent Laid-open No. Sho 62-155192. Accordingly, when the number of switches is increased, the periphery of the handle bar is complicated by the switches and the operation of the switches is also complicated.

Accordingly, it is desired to reduce the number of switches, thereby allowing the selection of a desired shift mode or the performance of shift-down and shift-up by a simpler operation.

SUMMARY AND OBJECTS OF THE INVENTION

It is therefore an object of the present invention to provide a motorcycle having a switch configuration which can increase the number of shift modes without complicating the operation of a transmission.

In accordance with a first aspect of the present invention, there is provided a motorcycle having a transmission operated by selecting either an automatic shift mode or a manual shift mode. The transmission is operated in any one of a plurality of automatic shift modes including a first automatic shift mode and a second automatic shift mode which are different in shift characteristics from the first automatic shift mode. The motorcycle includes a selector switch for selecting either the automatic shift mode or the manual shift mode and a shift control switch having a function of selecting any one of the plurality of automatic shift modes when the automatic shift mode has been selected by the selector switch. The selector switch also functions as a shift switch when the manual shift mode has been selected by the selector switch. The selector switch is mounted on a handle bar of the vehicle near one end of the handle bar, whereas the shift control switch is mounted on the handle bar near the other end thereof.

In accordance with a second aspect of the present invention, there is provided a motorcycle having a transmission operated by selecting either an automatic shift mode where a speed ratio is automatically decided according to the rotational speed of a prime mover or a manual shift mode. The transmission is operated in any one of a plurality of automatic shift modes including a first automatic shift mode and a second automatic shift mode different in shift characteristics from the first automatic shift mode. The motorcycle includes a selector switch for periodically selecting any one of the plurality of automatic shift modes and the manual shift mode every time the selector switch is operated and a shift control switch having a function as a shift switch when the manual shift mode has been selected by the selector switch. The selector switch is mounted on a handle bar of the vehicle near one end of the handle bar, whereas the shift control switch is mounted on the handle bar near the other end thereof.

In accordance with a third aspect of the present invention, the selector switch includes a push-button switch for alternately switching between the automatic shift mode and the manual shift mode every time the push-button switch is operated.

In accordance with a fourth aspect of the present invention, the motorcycle further includes a switch housing for accommodating a plurality of switches including the selector switch so that the selector switch is located in the vicinity of a grip provided on the handle bar and is directed forward of the vehicle body. The selector switch is mounted through the switch housing to the handle bar.

According to the first or second aspect of the present invention, the switches for operating the transmission are dispersively arranged near the right and left ends of the handle bar and each switch has a plurality of functions. Accordingly, it is possible to increase the degree of freedom of layout in the vicinity of the handle bar where the layout is prone to be complicated.

More particularly, according to the second aspect of the present invention, the function of the shift control switch can be changed according to the operation of the selector switch, thereby allowing a reduction in number of switches. Accordingly, it is possible to increase the degree of freedom of layout in the vicinity of the handle bar where the layout is prone to be complicated. More particularly, the selector switch and the shift control switch are separately arranged F near the right and left ends of the handle bar. Accordingly, the arrangement near each end of the handle bar can be simplified and the operability can also be improved.

According to the third aspect of the present invention, a desired mode can be selected by a simple operation of pushing the switch.

According to the fourth aspect of the present invention, the space for arranging the switch housing for accommodating the plurality of switches can be efficiently used. Further, since the selector switch is located near the grip and directed forward of the vehicle body, the selector switch can be suitably operated in the condition where the grip is grasped and the index finger is straightened.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
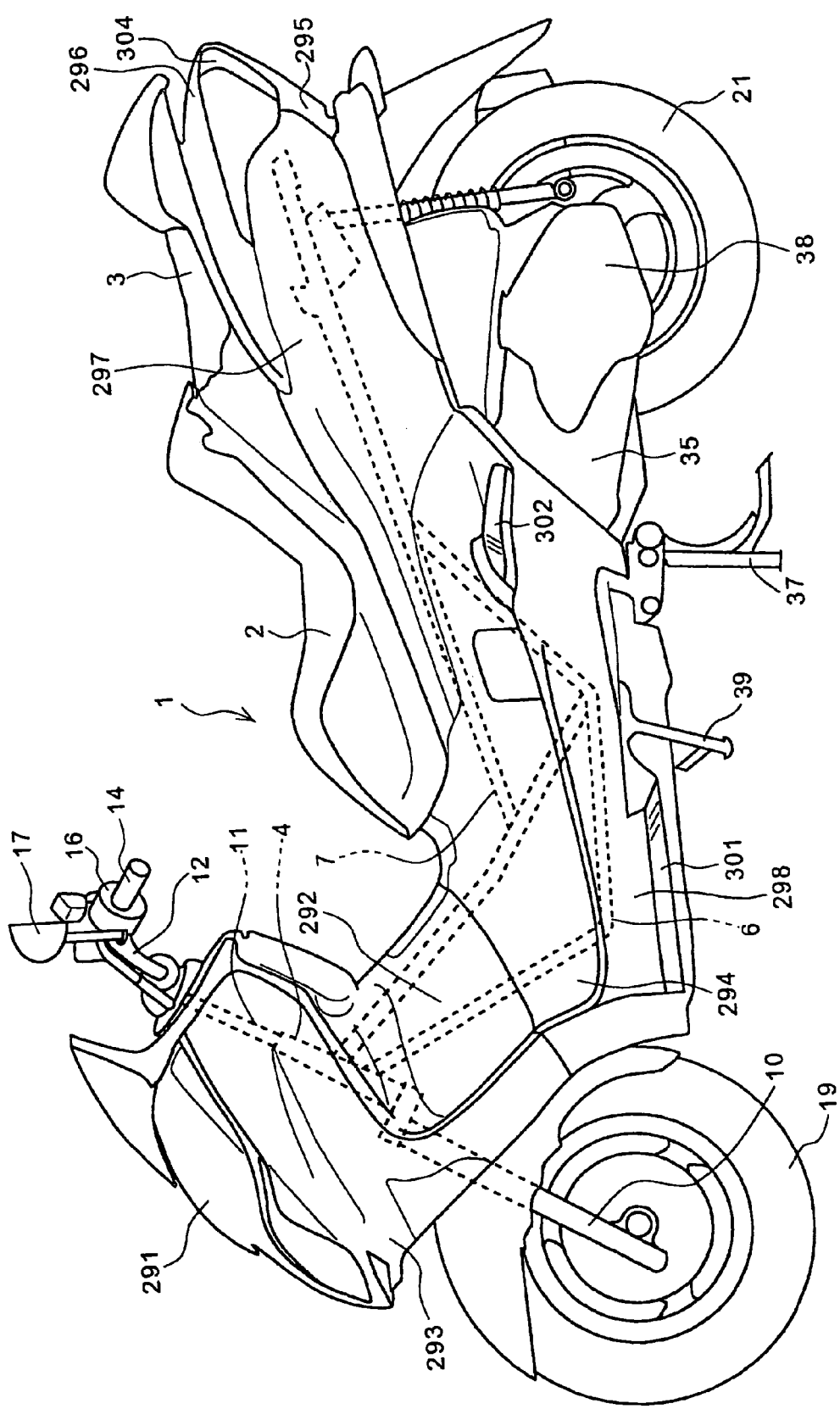
FIG. 2 is a side view of a motorcycle having the transmission control device according to the preferred embodiment.
Figure 3:
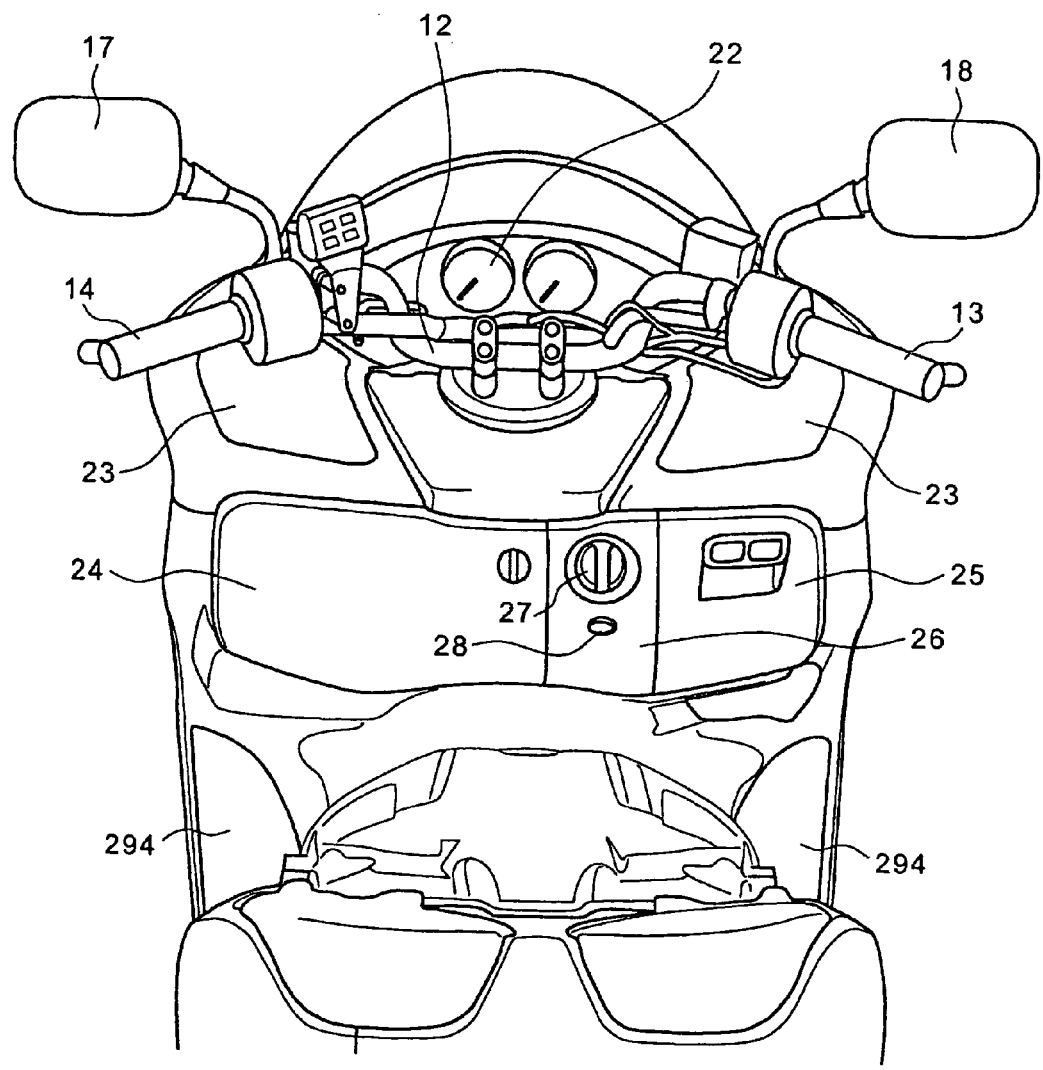
FIG. 3 is a perspective view of the motorcycle as viewed from a driver's seat.

A preferred embodiment of the present invention will now be described with reference to the drawings. FIG. 2 is a side view of a motorcycle 1 according to a preferred embodiment of the present invention and FIG. 3 is a perspective view of a front portion of the vehicle as viewed from the driver's seat. As shown in FIG. 2, the motorcycle 1 is a tandem vehicle having a driver's seat 2 and a passenger's seat 3 arranged in tandem. The driver's seat 2 and the passenger's seat 3 are provided with a seat lock (not shown) adapted to be unlocked by remote control. The motorcycle 1 includes a body frame composed of a head pipe 4, a down tube 6 extending rearwardly and downwardly from the head pipe 4 and a main tube 7 extending rearwardly and upwardly from the down tube 6. A front fork 10 is rotatably supported on the head pipe 4. A handle bar 12 is mounted through a handle shaft 11 to an upper extending portion of the front fork 10. The handle bar 12 extends laterally of the vehicle body, and a right grip 13 and a left grip 14 are provided at the opposite ends of the handle bar 12. A right switch unit 15 and a left switch unit 16 are arranged adjacent to the right grip 13 and the left grip 14, respectively. The right and left switch units 15 and 16 will be described later in detail. A left mirror 17 and a right mirror 18 are mounted on the handle bar 12. A front wheel 19 is supported to the lower end of the front fork 10.

An engine (not shown) is suspendedly supported to the main tube 7 and the output from the engine is transmitted through a continuously variable transmission (CVT) 35 and a speed reducer 38 to a rear wheel 21 as a drive wheel.

As shown in FIG. 3, instruments 22, audio speakers 23, etc. are arranged around the handle bar 12. A drawing type storage box 24, a pivot type (lower hinged) storage box 25 and a handle lock module 26 are provided on the front side of the driver's seat 2 in opposed relationship therewith. The handle lock module 26 is located between the storage boxes 24 and 25. The handle lock module 26 has a lock mechanism including a lock pin (not shown) adapted to project into or retracted from the handle shaft 11, thereby disabling the steering operation of the handle bar 12 or enabling the steering operation of the handle bar 12. The handle lock module 26 further has a function of switching the condition of an electronic control unit provided in the vehicle body between an operation stop condition and an operation start condition. The handle lock module 26 is provided with a handle lock release knob 27 and a seat lock release switch 28 as operation switches. The handle lock module 26 includes a communication device adapted to communicate with a communication device installed in a key for the vehicle. The communication device in the handle lock module 26 performs an identification procedure for ID information. After this ID information is identified as correct ID information, the knob 27 and the switch 28 become operable and the electronic control unit is also switched to its operation start condition.

The vehicle body is covered with a front cover 291, a floor side cover 298, a leg shield 292, a front side cover 293, a floor center cover 294, a rear lower cover 295, a rear center cover 296 and a body side cover 297. The vehicle body can be supported by a main stand 37 or a side stand 39. The floor side cover 298 on each side of the vehicle body is provided with a driver's step 301. Further, a passenger's step 302 projects laterally from the main tube 7 on each side of the vehicle body. A tail lamp unit 304 is provided between the rear center cover 296 and the rear side cover 295. The tail lamp unit 304 includes position lamps, stop lamps and winker lamps.

Figure 4:
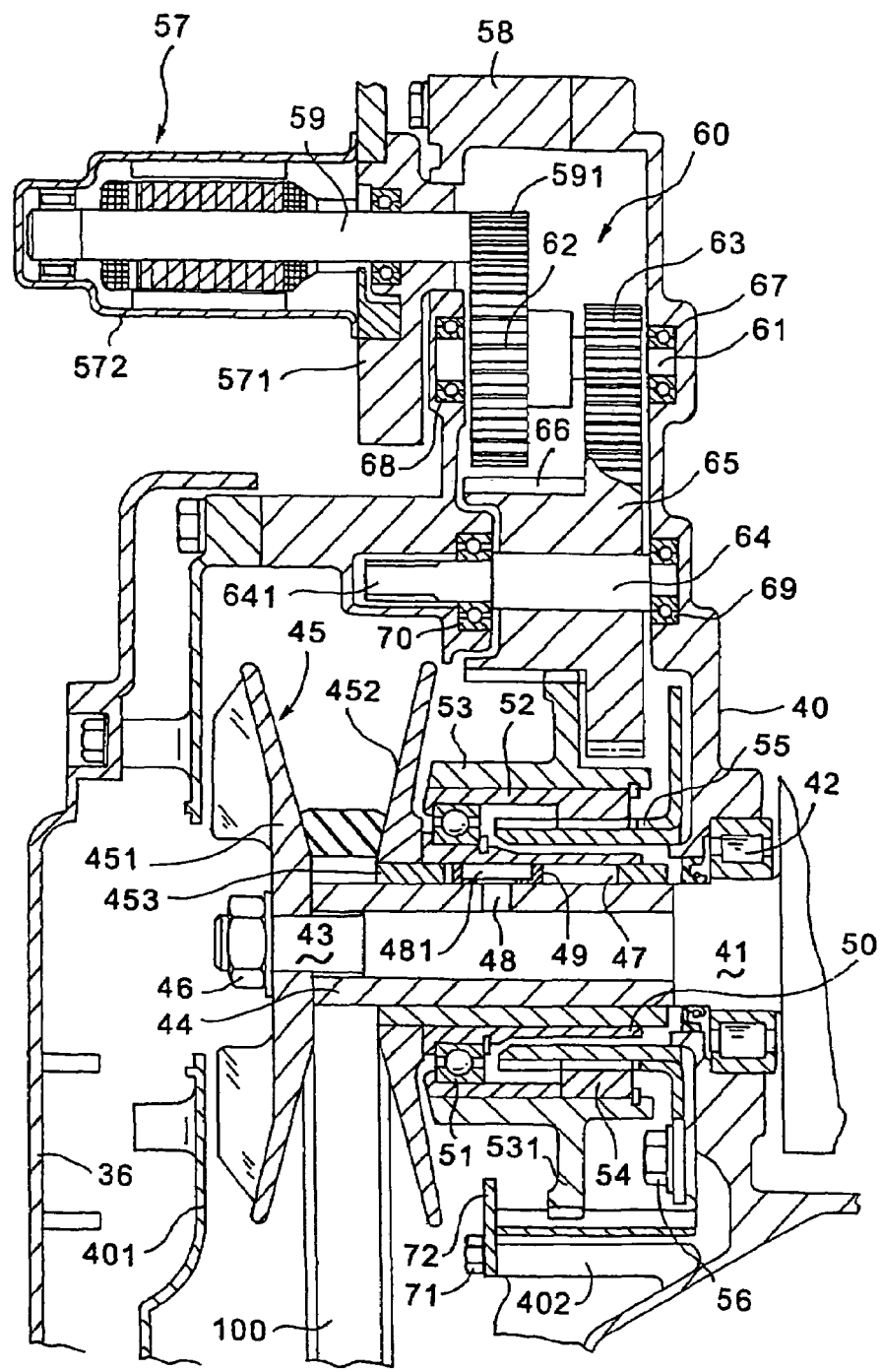
FIG. 4 is a sectional view of a front portion of a belt type CVT suitable for use in embodying the present invention.
Figure 5:
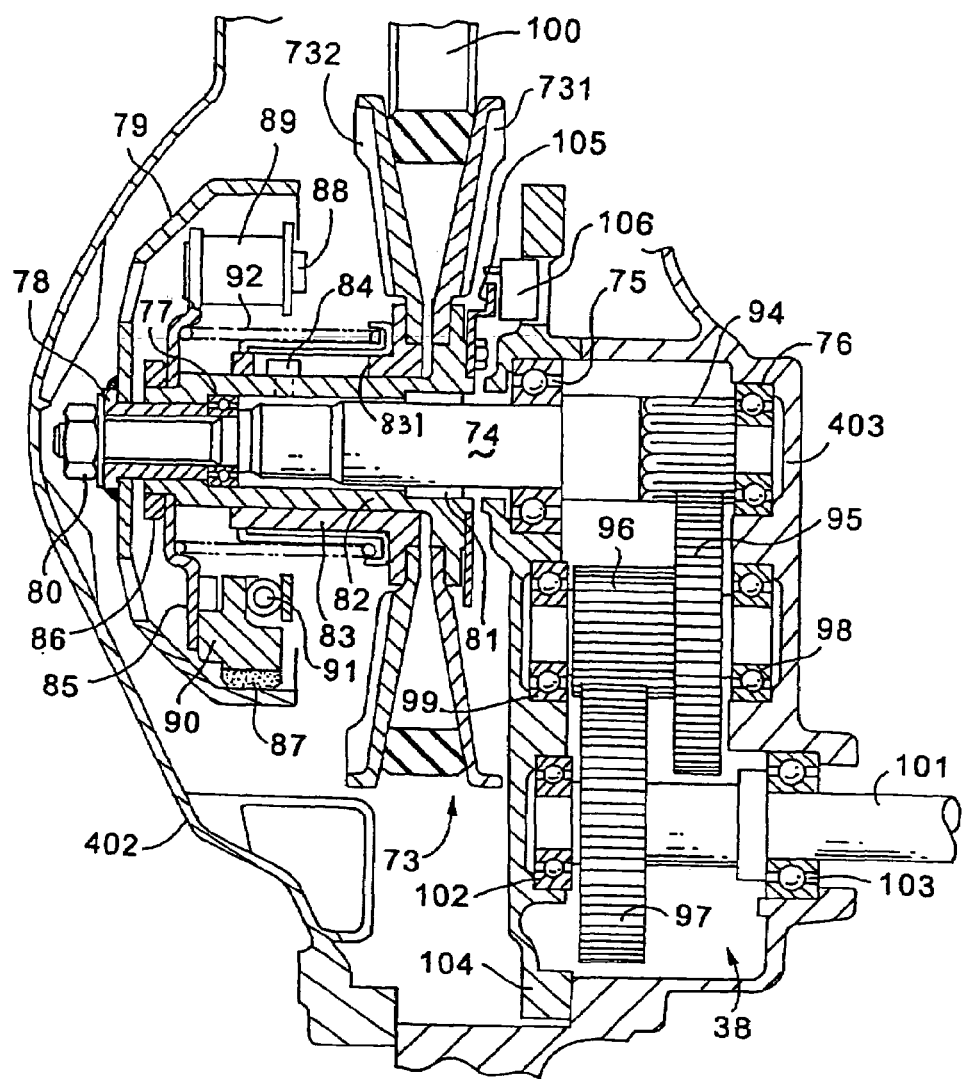
FIG. 5 is a sectional view of a rear portion of the belt type CVT.

FIG. 4 is a sectional view of a front portion of the CVT and FIG. 5 is a sectional view of a rear portion of the CVT. As shown in FIGS. 4 and 5, the CVT includes a transmission case 40 as a part of an engine crankcase, that is, a case body 40 of the CVT. The transmission case 40 is largely open on one side surface. The CVT further includes a transmission case cover

401 for covering the open side of the transmission case 40 from the left side surface of the vehicle, an outer cover 36 for covering the transmission case cover 401 and an actuator cover 58 mounted to a front portion of the transmission case cover 401 (front portion in the operating direction of the vehicle) for covering a motor 57 and a gear unit 60 as an actuator for driving the transmission. Seals are provided between the transmission case 40 and the transmission case cover 401 and between the transmission case 40 and the actuator cover 58.

As shown in FIG. 4, a crankshaft 41 is supported by a bearing 42 provided on the transmission case 40 and by another bearing (not shown). The crankshaft 41 projects outwardly from the transmission case 40 at a portion 43. This projecting portion 43 of the crankshaft 41 functions as a support shaft for a drive pulley 45 and functions also as a drive shaft of the CVT.

A guide pipe 44 is mounted on the outer circumference of the drive shaft 43. The drive pulley 45 is composed of a fixed pulley portion (which will be hereinafter referred to as a "fixed portion") 451 fixed to the outer end of the drive shaft 43 and a movable pulley portion (which will be hereinafter referred to as a "movable portion") 452 movable in the axial direction of the drive shaft 43. A V-belt 100 is wrapped between the drive pulley 45 and a driven pulley to be hereinafter described. The fixed portion 451 is fixed to the drive shaft 43 by a nut 46 tightly engaged with a threaded portion formed at the outer end of the drive shaft 43. A hub 453 for the movable portion 452 is slidably fitted with the outer circumference of the guide pipe 44, so as to make the movable portion 452 movable in the axial direction of the drive shaft 43.

The hub 453 for the movable portion 452 is formed with a guide hole 47 elongated in the axial direction of the drive shaft 43. A guide pin 48 extends radially of the guide pipe 44 and a head portion 481 of the guide pin 48 projects into the guide hole 47. The head portion 481 of the guide pin 48 is covered with a collar 49 facing at least the inner surface of the guide hole 47. The collar 49 is formed of fluororesin having a small coefficient of friction. Preferably, the collar 49 also covers the lower surface of the head portion 481 facing the outer circumference of the guide pipe 44 as shown in FIG. 4. With this structure, the movable portion 452 to which the hub 453 is fixed is restricted in rotational displacement relative to the guide pipe 44, or the drive shaft 43 by the guide pin 48 and is movable only in the axial direction of the drive shaft 43. The guide pin 48 is slid relatively within the guide hole 47 of the hub 453 through the collar 49, so that the generation of a sliding noise can be suppressed.

A bearing retainer ring 50 is fitted with the outer circumference of the hub 453 for the movable portion 452 and the inner ring of a bearing 51 is fitted with the outer circumference of the ring 50. A slider retainer ring 52 is fitted with the outer ring of the bearing 51 and a slider 53 is fitted with the outer circumference of the ring 52. The slider 53 is cylindrical and the outer circumference of the slider 53 is formed with a gear 531. A feed ring 54 having an internal thread (screw thread) on its inner circumference is fitted with the inner circumference of the slider 53. The internal thread of the feed ring 54 is engaged with an external thread (screw thread) formed on the outer circumference of a cylindrical member 55. The cylindrical member 55 has a flange portion welded to its outer circumference and this flange portion is fixed to the transmission case 40 by a bolt 56.

There will now be described a drive unit for transmitting a drive force to the gear 531 of the slider 53. The drive unit for driving the gear 531 of the slider 53 includes the gear unit 60 and the motor 57. The motor 57 includes a base plate 571 and a housing 572. The base plate 571 is fixedly engaged with the actuator cover 58 mounted on the transmission case 40. The motor 57 further includes a motor shaft 59 having an outer end formed with an output gear 591.

The gear unit 60 includes first-stage gears 62 and 63 fixed to a common shaft 61 and second-stage gears 65 and 66 fixed to another common shaft 64. Preferably, each gear of the gear unit 60 is formed of resin, so as to reduce noise of operation. The shaft 61 for the first-stage gears 62 and 63 is supported by a bearing 67 provided on the transmission case 40 and a bearing 68 provided on the actuator cover 58. On the other hand, the shaft 64 for the second-stage gears 65 and 66 is supported by a bearing 69 provided on the transmission case 40 and a bearing 70 provided on the actuator cover 58. The larger gear 62 of the first-stage gears is in mesh with the output gear 591 and the smaller gear 63 of the first-stage gears is in mesh with the larger gear 65 of the second-stage gears. The smaller gear 66 of the second-stage gears is in mesh with the gear 531 of the slider 53.

The shaft 64 for the second-stage gears extends at its left end portion through the bearing 70. The extended portion of the shaft 64 is formed with a gear 641. The gear 641 is a worm gear that is in mesh with a worm wheel connected to a rotary variable resistor or a rotary potentiometer as a rotation sensor (the worm wheel and the rotation sensor will be hereinafter described). Thus, the shaft 64 has a function as a sensor output shaft for transmitting a rotational amount of the gear unit 60 to the rotation sensor.

The transmission case 40 is formed with a rib 402 for surrounding the outer circumference of the gear 531 of the slider 53. A restriction plate 72 is mounted on the left end of the rib 402 by a bolt 71. By providing the restriction plate 72, the limit of movement of the slider 53 toward the drive pulley 45 is defined. Usually, the gear 531 of the slider 53 is moved in the range where it does not abut against the restriction plate 72.

The rotation of the motor shaft 59 in the motor 57 is transmitted through the output gear 591, the first-stage gears 62 and 63 and the second-stage gears 65 and 66 in this order to the gear 531 of the slider 53, thereby rotating the slider 53. When the slider 53 is rotated, the feed ring 54 is rotated around the cylindrical member 55, so that the slider 53 is relatively fed by the engagement of the screw threads in the axial direction of the crankshaft 41. The direction of displacement of the slider 53 by the operation of the screw threads depends on the directions of the internal thread of the feed ring 54 and the external thread of the cylindrical member 55.

When the slider 53 is displaced along the drive shaft 43, this movement is transmitted through the bearing 51 to the movable portion 452, thereby changing the spacing between the movable portion 452 and the fixed portion 451. When the spacing between the fixed portion 451 and the movable portion 452 is increased, the V-belt 100 cooperates with the driven pulley to be hereinafter described so that the wrapping radius of the V-belt 100 on the drive pulley 45 is decreased. Conversely, when a force having such a direction so as to reduce the spacing between the fixed portion 451 and the movable portion 452 is applied to the movable portion 452, the V-belt 100 is shifted radially outwardly of the drive pulley 45 by a component of this force. As a result, the wrapping radius of the V-belt 100 on the drive pulley 45 is increased in cooperation with the driven pulley.

The position of the slider 53 represents the speed ratio in this transmission. Accordingly, by using the rotation sensor for detecting a rotational position of the worm gear 641 to detect the position of the slider 53, the result of this detection can be fed back to the control of the speed ratio.

The configuration of a rear portion of the CVT will now be described. Referring to FIG. 5, a driven pulley 73 is composed of a fixed portion 731 and a movable portion 732. A driven shaft (support shaft for the driven pulley 73) 74 for supporting the driven pulley 73 is supported by bearings 75 and 76. A bearing 77 is mounted on an end portion of the driven shaft 74 on one side, i.e., on the left side of the bearing 75 as viewed in FIG. 5. Further, a collar 78 is mounted on the end portion of the driven shaft 74 on the left side of the bearing 77 as viewed in FIG. 5. A bowl-shaped clutch plate 79 is welded to the collar 78. This end portion of the driven shaft 74 is formed with a thread. A nut 80 is tightly engaged with the thread so that the collar 78 and the clutch plate 79 are fixed through the inner ring of the bearing 77 to the driven shaft 74. A bearing 81 is provided on the outer circumference of an intermediate portion of the driven shaft 74 and a hub 82 for the fixed portion 731 is rotatably mounted on the outer circumference of the driven shaft 74 by the bearings 81 and 77.

A hub 83 for the movable portion 732 is provided on the outer circumference of the hub 82 for the fixed portion 731. The movable portion 732 is slidable relative to the fixed portion 732 in the axial direction of the driven shaft 74. The hub 82 is provided with a guide pin 84 extending radially and having a head portion projecting from the outer circumference of the hub 82. The hub 83 is formed with a guide hole 831 engaging with the head portion of the guide pin 84, thereby restricting the rotation of the movable portion 732 relative to the hub 82.

A support plate 85 for a clutch shoe 87 is fixed by a nut 86 to an end portion of the hub 82 for the fixed portion 731. The clutch shoe 87 is supported on the support plate 85. The clutch shoe 87 is fixed to an arm 90 having a boss 89 supported to a shaft 88 extending from the support plate 85 at right angles thereto. The arm 90 is biased by a spring 91 in such a direction that the clutch shoe 87 is moved away from the inner surface of the clutch plate 79. Further, a coil spring 92 for biasing the movable portion 732 toward the fixed portion 731 is interposed between the movable portion 732 and the support plate 85.

The speed reducer 38 is provided in the rear portion of the CVT. The speed reducer 38 has an input gear 94 provided at the other end of the driven shaft 74, that is, between the bearings 75 and 76 as shown in FIG. 5. The speed reducer 38 further has intermediate gears 95 and 96 and a final-stage gear 97. The input gear 94 is in mesh with the larger gear 95 of the intermediate gears and the smaller gear 96 of the intermediate gears is in mesh with the final-stage gear 97. A shaft for the intermediate gears 95 and 96 is supported by bearings 98 and 99 and a shaft for the final-stage gear 97 as an output shaft 101 is supported by bearings 102 and 103. The bearings 76, 98 and 103 are fitted with a rear casing 403 contiguous to the rib 402. The bearings 75, 99, and 102 are fitted with a speed reducer cover 104 fixed to the casing 403.

A sensor plate 105 is provided on a side surface of the hub 82 for the fixed portion 731 and a magnetic sensor 106 is provided so as to face the outer circumference of the sensor plate 105. The sensor plate 105 is formed of iron and the outer circumference of the sensor plate 105 has at least one projection or recess. Accordingly, the output from the magnetic sensor 106 changes upon detection of such a shape changed portion of the sensor plate 105 and according to a condition of this change, e.g., an interval of output change, the rotational speed of the driven pulley 73 can be detected. The magnetic sensor 106 is fixed to the speed reducer cover 104.

When the wrapping radius of the V-belt 100 on the drive pulley 45 is increased, the tension applied to the V-belt 100 is increased, so that the spacing between the movable portion 732 and the fixed portion 731 of the driven pulley 73 is increased by the V-belt 100. As a result, the wrapping radius of the V-belt 100 on the driven pulley 73 is decreased and the reduction ratio is therefore decreased. Conversely, when the wrapping radius of the V-belt 100 on the drive pulley 45 is decreased, the tension applied to the V-belt 100 is decreased. When the biasing force of the coil spring 92 exceeds a component of the tension applied to the V-belt 100, the spacing between the movable portion 732 and the fixed portion 731 of the driven pulley 73 is decreased. As a result, the wrapping radius of the V-belt 100 on the driven pulley 73 is increased and the reduction ratio is therefore increased.

When the rotational speed of the driven pulley 73 reaches a predetermined value, a centrifugal force is increased to make the clutch shoe 87 abut against the clutch plate 79. Accordingly, the driven shaft 74 connected to the clutch plate 79 is rotated to thereby rotate the output shaft 101 through the input gear 94, the intermediate gears 95 and 96 and the final-stage gear 97. The rotation of the output shaft 101 is transmitted to the rear wheel 21.

Figure 1:
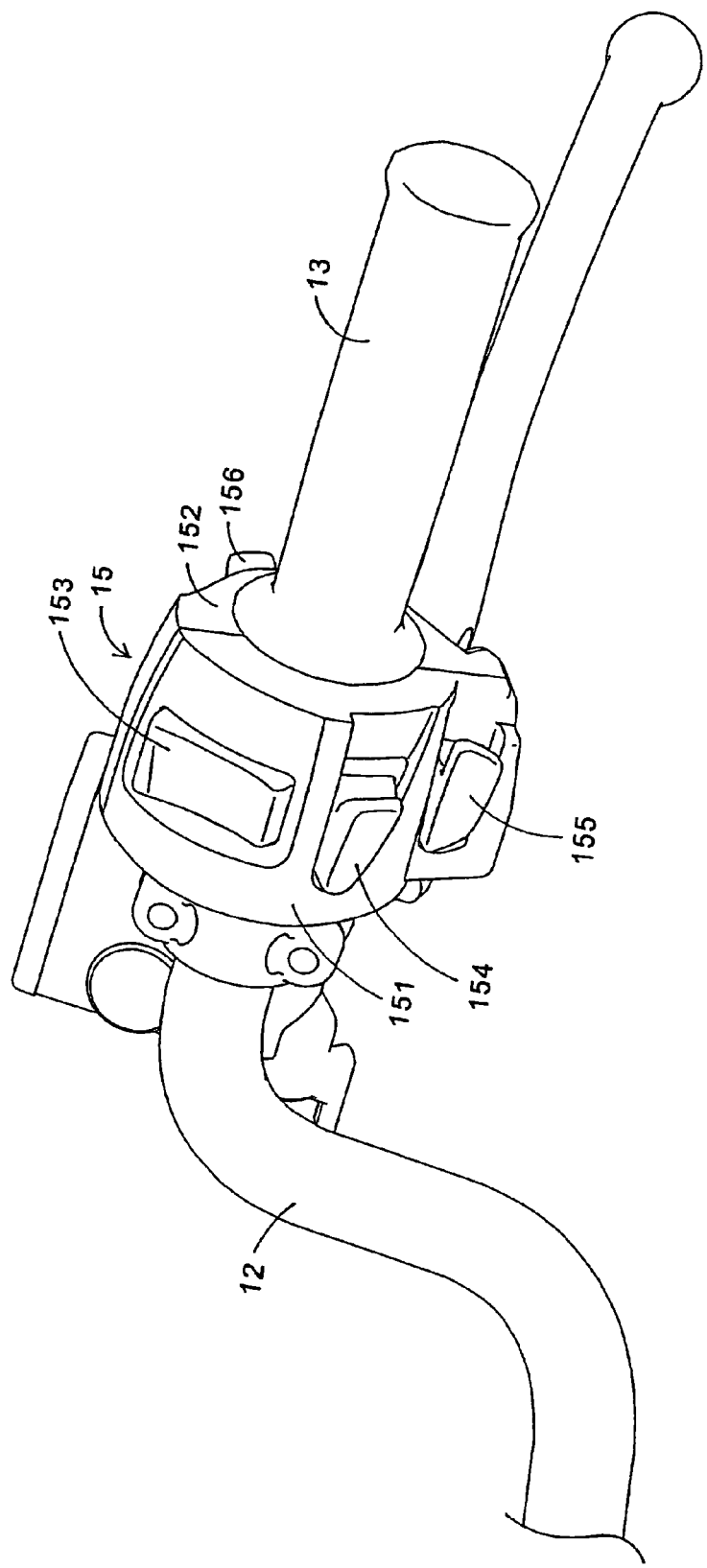
FIG. 1 is a perspective view showing a right switch unit in a transmission control device according to a preferred embodiment of the present invention.
Figure 6:
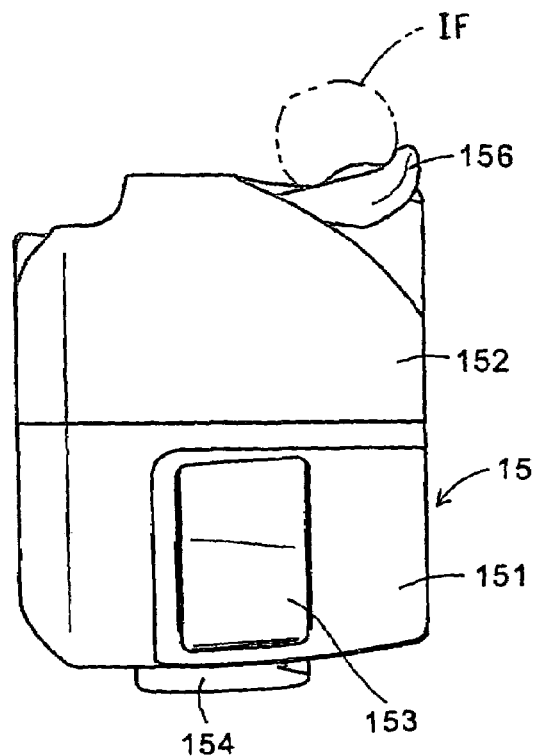
FIG. 6 is a plan view of the right switch unit.
Figure 7:
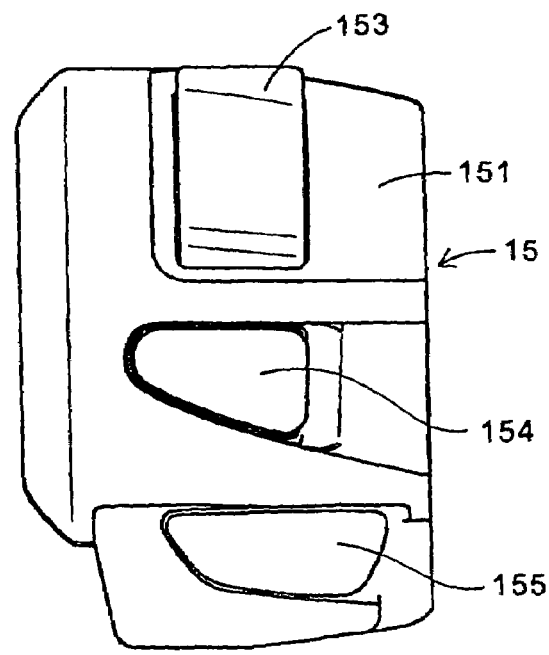
FIG. 7 is an elevational view of the right switch unit.
Figure 8:
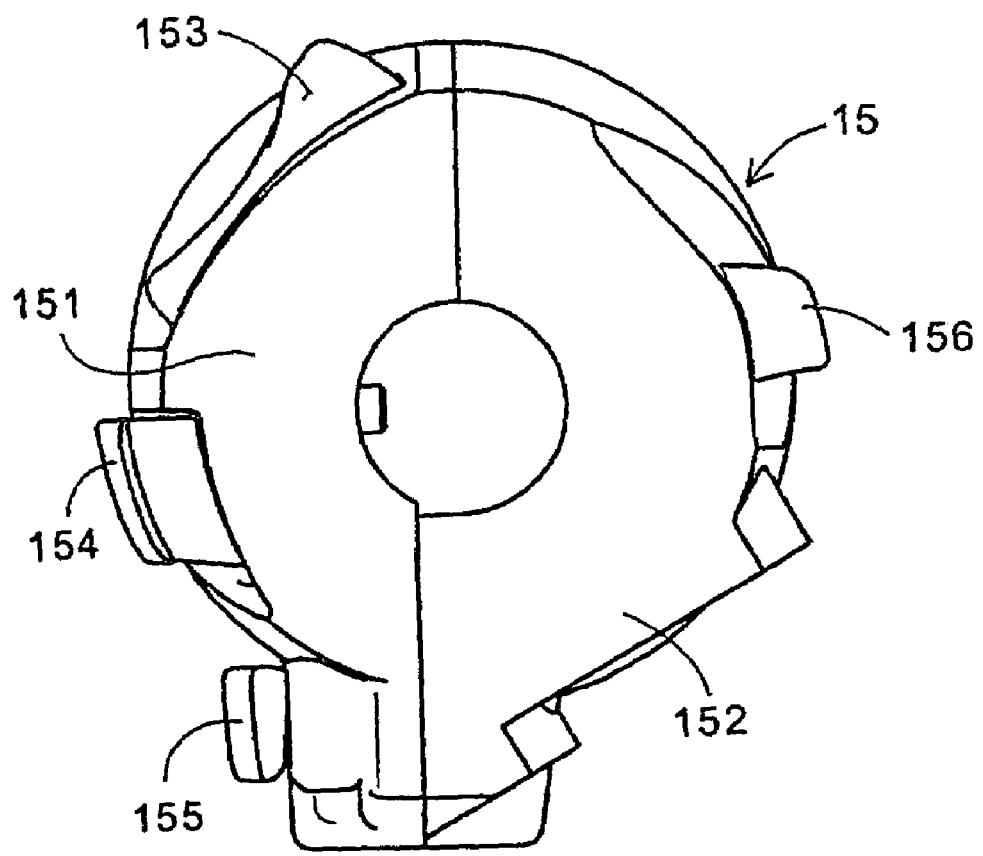
FIG. 8 is a side view of the right switch unit.

The switch units 15 and 16 fixed to the handle bar 12 will now be described in detail. FIG. 1 is a perspective view of the right switch unit 15 and FIGS. 6, 7 and 8 are plan, elevational and side views of the right switch unit 15, respectively. The right switch unit 15 has two, equally divided housings 151 and 152 mounted on the handle bar 12 so as to hold it from the front and rear sides in the vicinity of the right grip 13.

The housing 151 facing the driver's seat is provided with an engine stop switch 153, a hazard switch 154 and a starter switch 155 arranged in this order from the upper side. The engine stop switch 153 is a switch for cutting off an ignition system and a fuel supply system in an emergency or the like, thereby stopping the engine. The hazard switch 154 is a switch for flashing the winker lamps in the tail lamp unit 304 and winker lamps provided at a front portion of the vehicle body. The starter switch 155 is a switch for actually starting the engine in the condition where the engine start is allowed by the operation of the knob 27 in the handle lock module 26. The switches 153, 154, and 155 are located at positions suitable for operation by the driver mainly with the thumb of the driver's right hand in the condition where the right grip 13 is grasped by the driver's right hand.

On the other hand, the housing 152 opposite to the driver's seat is provided with a selector switch 156 for selecting an automatic shift mode or a manual shift mode as the shift mode for the CVT. The selector switch 156 is located at a position suitable for operation by the driver mainly with the index finger IF (see FIG. 6) of the driver's right hand in the condition where the right grip 13 is grasped by the driver's right hand. Further, the shape of the selector switch 156 is set so that it is easily caught by the index finger IF of the right hand. Preferably, the selector switch 156 is a push-button switch.

Figure 9:
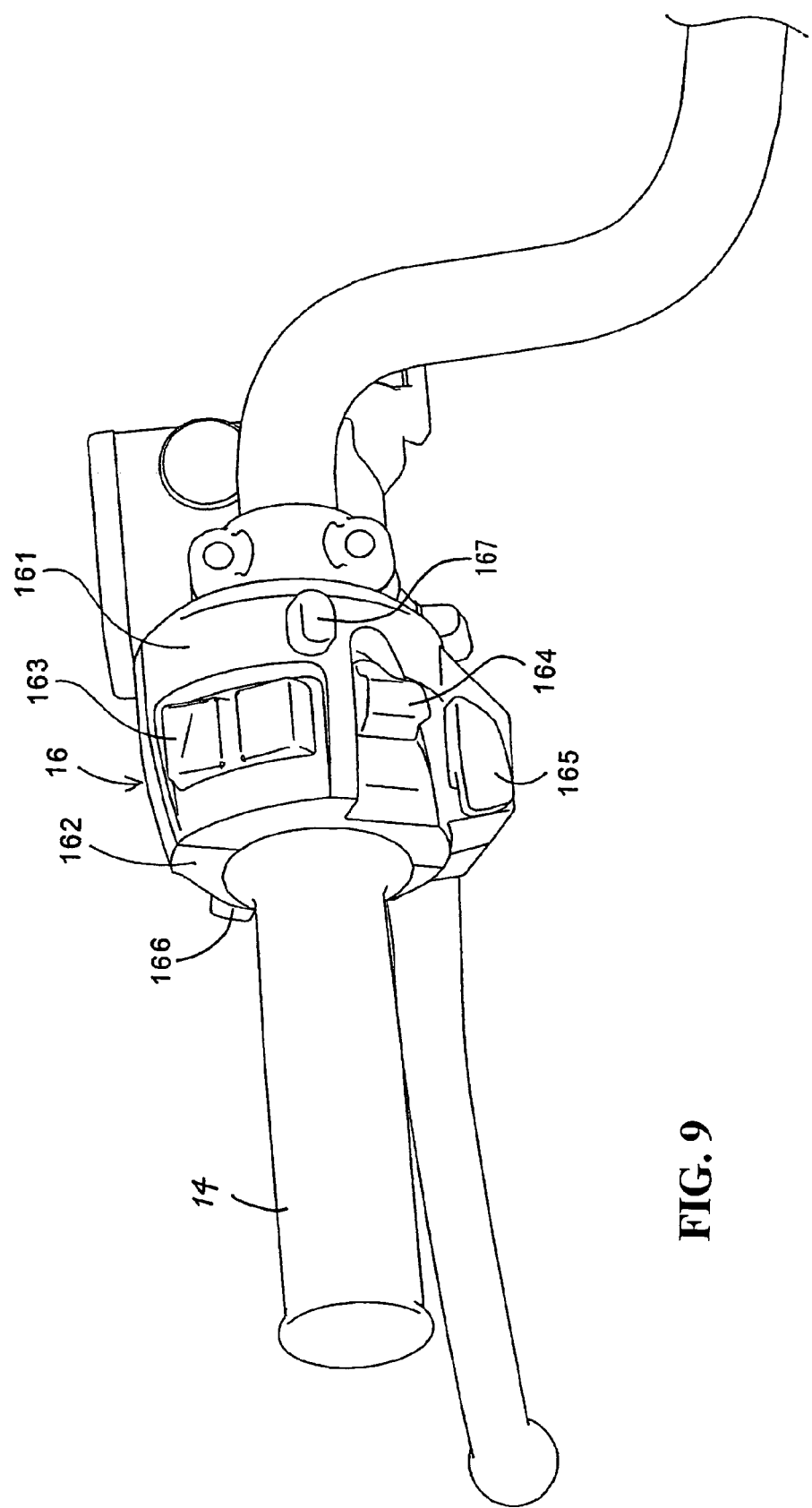
FIG. 9 is a perspective view of a left switch unit.
Figure 10:
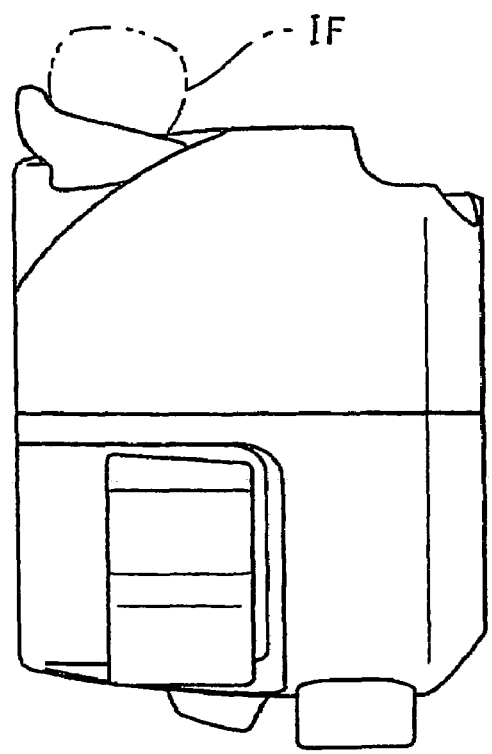
FIG. 10 is a plan view of the left switch unit.
Figure 11:
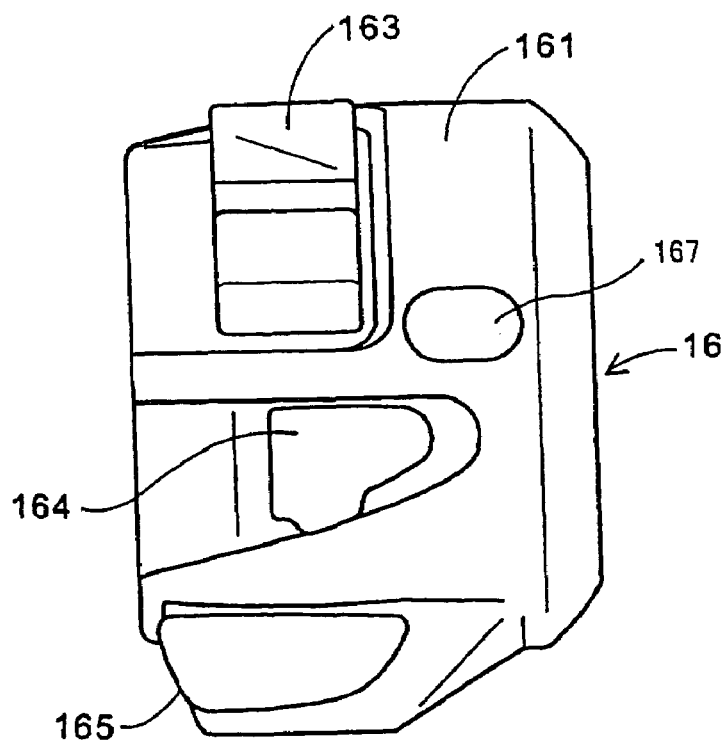
FIG. 11 is an elevational view of the left switch unit.
Figure 12:
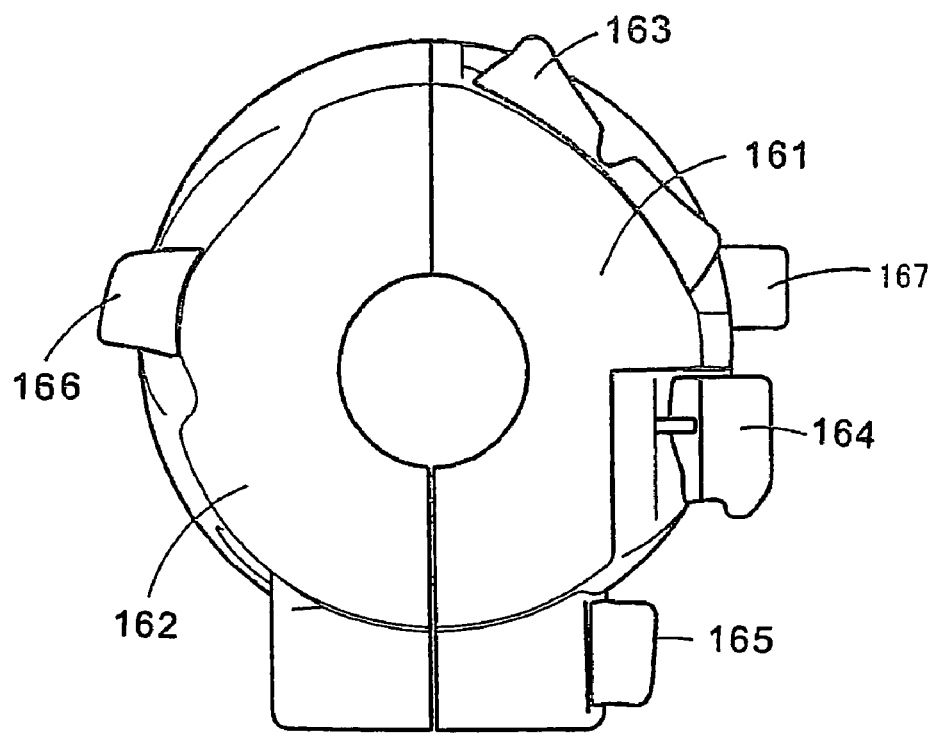
FIG. 12 is a side view of the left switch unit.

The left switch unit 16 will now be described. FIG. 9 is a perspective view of the left switch unit 16. FIGS. 10, 11 and 12 are plan, elevational and side views of the left switch unit 16, respectively. The left switch unit 16 has two, equally divided housings 161 and 162 mounted on the handle bar 12 so as to hold it from the front and rear sides in the vicinity of the left grip 14.

The housing 161 facing the driver's seat is provided with a shift switch 163 as a shift control switch, a dimmer switch 167, a winker switch 164 and a horn switch 165 arranged in this order from the upper side. The shift switch 163 is a switch for use in performing a shift-down and shift-up operation of the CVT. This switch is a swing type switch adapted to be returned to a neutral position by a spring. The winker switch 164 is a switch for flashing the winker lamps included in the tail lamp unit 304 and the winker lamps provided at the front portion of the vehicle. The horn switch 165 is a switch for use in sounding an alarm horn. The dimmer switch 167 is a switch for use in adjusting the brightness of a headlight and every time this switch is pushed, the headlight is selected between a high beam and a low beam. The switches 163, 164, 165 and 167 are located at the positions suitable for operation by the driver mainly with the thumb of the driver's left hand in the condition where the left grip 14 is grasped by the driver's left hand.

On the other hand, the housing 162 opposite to the driver's seat is provided with a passing switch 166. The passing switch 166 is located at the position suitable for operation by the driver mainly with the index finger IF (see FIG. 10) of the driver's left hand in the condition where the left grip 14 is grasped by the driver's left hand. Further, the shape of the passing switch 166 is set so that it is easily caught by the index finger IF of the left hand.

Figure 13:
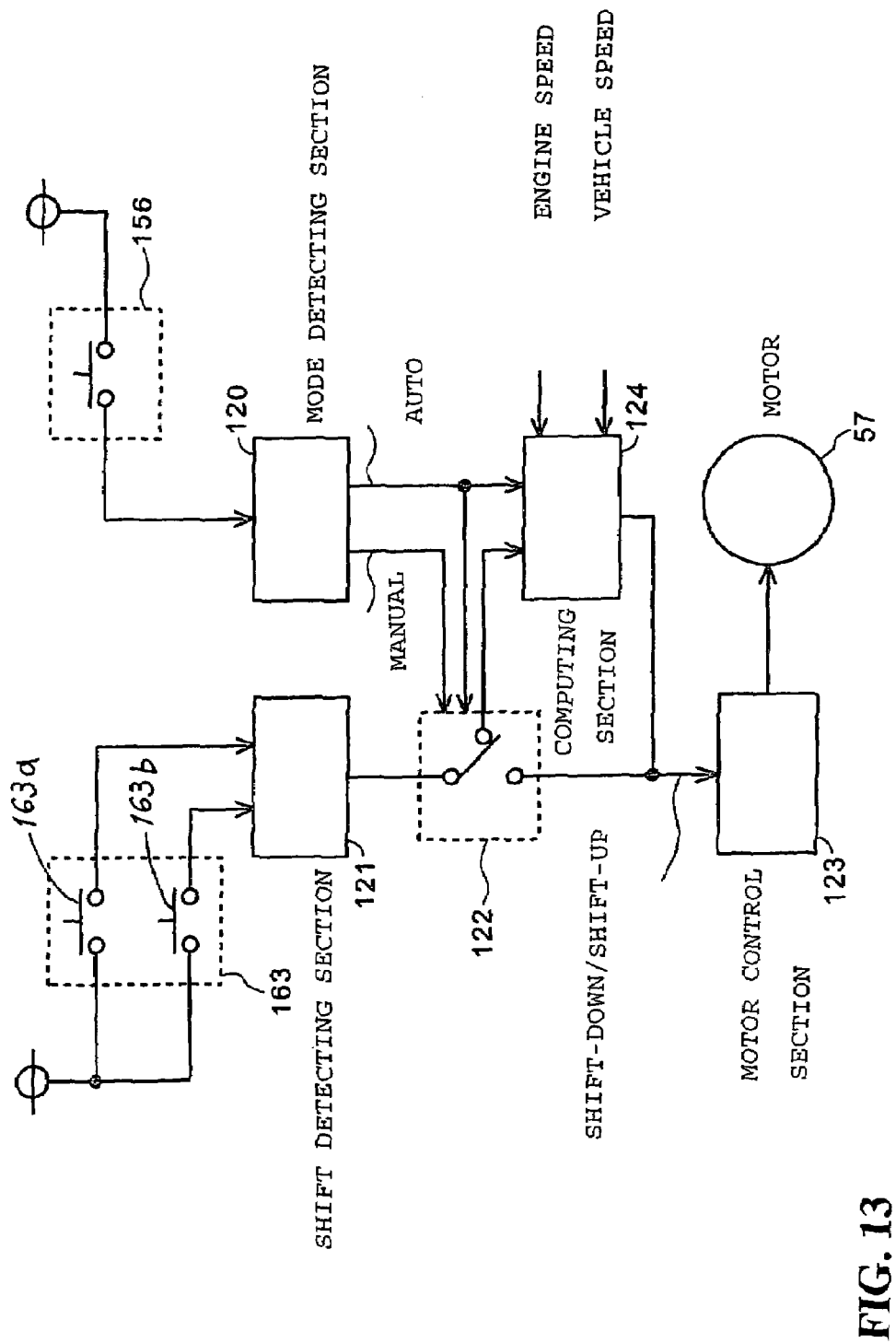
FIG. 13 is a block diagram showing the functions of the switch units.

The functions of the selector switch 156 and the shift switch 163 for the CVT will now be described. FIG. 13 is a block diagram showing the functions of the selector switch 156 and the shift switch 163. A mode detecting section 120 is provided to output two kinds of signals in response to the operation of the selector switch 156. These two kinds of signals are a manual shift select signal and an automatic shift select signal, which are distinguished from each other by on/off output signals (ON: manual shift select signal, OFF: automatic shift select signal). Preferably, an indicator lamp for indicating which of the manual shift mode and the automatic shift mode is now selected by the selector switch 156 is provided adjacent to the instruments 22, for example.

The shift switch 163 includes a shift-up contact 163a and a shift-down contact 163b. A shift detecting section 121 is provided to detect which of the contacts 163a and 163b has been closed and to output a command corresponding to the closed contact 163a or 163b. More specifically, when the contact 163a has been closed, a shift-up command is output, whereas when the contact 163b has been closed, a shift-down command is output.

A switching section 122 is provided to connect the shift detecting section 121 to a motor control section 123 in response to the manual shift select signal from the mode detecting section 120 or to connect the shift detecting section 121 to a computing section 124 rather than the motor control section 123 in response to the automatic shift select signal from the mode detecting section 120.

The computing section 124 reads an engine speed Ne and a vehicle speed V when inputting the automatic shift select signal and outputs a shift command for setting a proper vehicle speed V0 corresponding to the engine speed Ne. For example, when the actual vehicle speed V is higher than the proper vehicle speed V0 corresponding to the engine speed Ne, a shift-down command is output to increase the reduction ratio. Conversely, when the actual vehicle speed V is lower than the proper vehicle speed V0 corresponding to the engine speed Ne, a shift-up command is output to decrease the reduction ratio.

When the shift-up command or the shift-down command from the shift switch 163 is input to the computing section 124, the computing section 124 regards this shift-up or shift-down command as a switching command for a first drive mode or a second drive mode and changes an arithmetic expression according to the relation to be described later.

In response to the shift-up command or the shift-down command, the motor control section 123 operates the motor 57 in a direction corresponding to the shift-up or shift-down command received.

Figure 14:
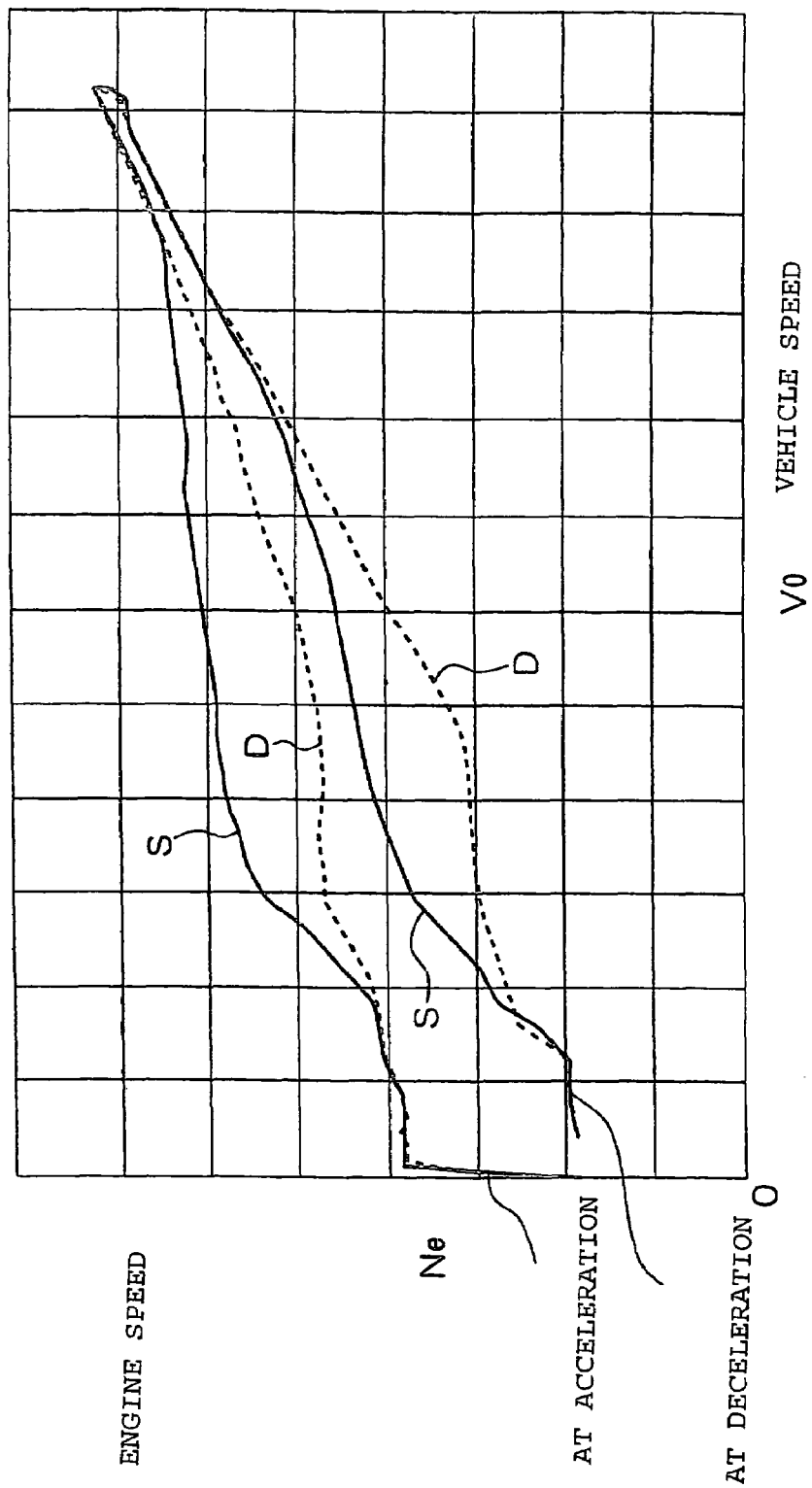
FIG. 14 is a graph showing the relation between engine speed and vehicle speed.

FIG. 14 is a graph showing the relation between engine speed Ne and the proper vehicle speed V0. As shown in FIG. 14, the proper vehicle speed V0 corresponding to the engine speed Ne at acceleration is different from that at deceleration. Further, the proper vehicle speed V0 in the first drive mode S is different from that in the second drive mode D.

The computing section 124 may decide an arithmetic expression based on the relation shown in FIG. 14 and may use this arithmetic expression to decide the proper vehicle speed V0 corresponding to the engine speed Ne. Alternatively, the computing section 124 may have the relation shown in FIG. 14 as a table and may use this table to decide the proper vehicle speed V0 corresponding to the engine speed Ne.

In the case of operating the vehicle in the manual shift mode, the selector switch 156 is first operated to select the manual shift mode. By this selection, the shift switch 163 is connected to the motor control section 123. Then, the shift switch 163 is used to select an arbitrary speed ratio.

In the case of operating the vehicle in the automatic shift mode, the selector switch 156 is first operated to select the automatic shift mode. By this selection, the shift switch 163 is connected to the computing section 124. Then, the shift switch 163 is used to select the first drive mode or the second drive mode as a running mode. In the automatic shift mode, shift-up or shift-down is automatic decided according to the operating mode selected above and the motor 57 is driven according to the shift-up or shift-down decided above.

The running modes are not limited to the first drive mode and the second drive mode, but may include other drive modes. As a modification, more operating modes may be selected. In the case of increasing the number of operating modes, the shift switch 163 is preferably operated on its one side to sequentially change the operating modes.

Figure 15:
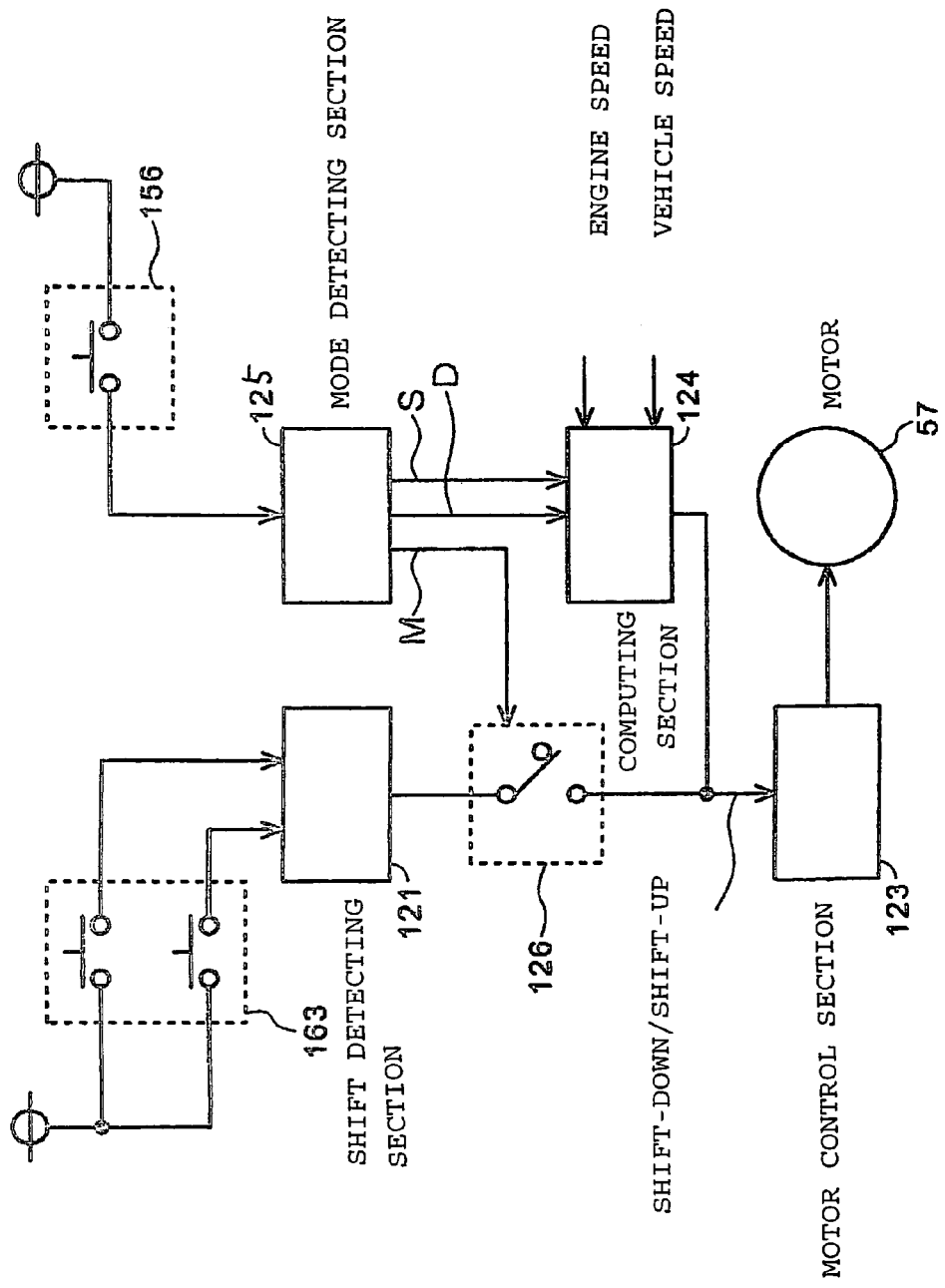
FIG. 15 is a block diagram showing the functions of the switch units according to a modification.
Figure 16:
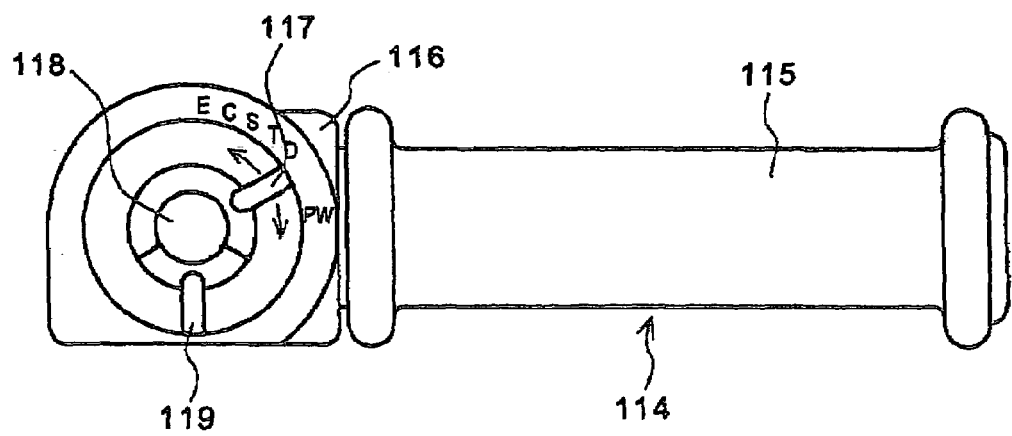
FIG. 16 is a plan view of a handle grip including switches in the prior art.

The functions of the switches 156 and 163 for the CVT may be modified in the following manner. FIG. 15 shows the functions of the switches 156 and 163 according to a modification of the above preferred embodiment. The same reference numerals as those in FIG. 13 denote the same or corresponding parts. Referring to FIG. 15, a mode detecting section 125 outputs a manual shift mode signal M, a first drive mode signal S and a second drive mode signal D in this order every time the selector switch 156 is operated. A switching section 126 switches to connect the shift detecting section 121 to the motor control section 123 in response to the manual shift mode signal M. Accordingly, when the first drive mode signal S or the second drive mode signal D is output, the shift detecting section 121 is disconnected from the motor control section 123.

When the first drive mode signal S or the second drive mode signal D is supplied to the computing section 124, the computing section 124 computes a shift-up command or a shift-down command in the automatic shift mode and outputs this command to the motor control section 123. More specifically, by using the characteristics of the first drive mode or the second drive mode shown in FIG. 14, the proper vehicle speed V0 corresponding to the engine speed Ne is decided and a command for deciding the rotational direction of the motor 57 is output so as to obtain this proper vehicle speed V0.

In the case of operating the vehicle in the manual shift mode, the selector switch 156 is first operated to select the manual shift mode. By this selection, the shift switch 163 is connected to the motor control section 123. Then, the shift switch 163 is used to select an arbitrary speed ratio.

In the case of operating the vehicle in the automatic shift mode, the selector switch 156 is operated to select any arbitrary one of the first drive mode and the second drive mode as the automatic shift mode. By this selection, the shift switch 163 is disconnected from the motor control section 123, so that the operation by the shift switch 163 becomes ineffective. When either the first drive mode or the second drive mode is selected, shift-up or shift-down is automatically decided according to the operating mode selected above, and the motor 57 is driven according to the shift-up or shift-down decided above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle having a transmission operated by selecting either an automatic shift mode where a speed ratio is automatically decided according to a rotational speed of a prime mover or a manual shift mode where a speed ratio is decided by a manual operation of an operator, in changing the rotational speed of said prime mover to transmit output rotation of said prime mover to a drive wheel comprising:
    a plurality of automatic shift modes including a first automatic shift mode and a second automatic shift mode different in shift characteristics from said first automatic shift mode for operating said transmission;
    a selector switch for selecting either said automatic shift mode or said manual shift mode; and
    a shift control switch having a function of selecting any one of said plurality of automatic shift modes when said automatic shift mode has been selected by said selector switch and also having a function as a shift switch when said manual shift mode has been selected by said selector switch;
    said selector switch being mounted on a handle bar of the motorcycle near a first end of said handle bar, whereas said shift control switch is mounted on said handle bar near a second end of the handle bar.

2. The motorcycle having a transmission according to claim 1, wherein said selector switch comprises a push-button switch for alternately switching between said automatic shift mode and said manual shift mode every time said push-button switch is operated.

3. The motorcycle having a transmission according to claim 1, and further comprising a switch housing for accommodating a plurality of switches including said selector switch wherein said selector switch is located in the vicinity of a grip provided on said handle bar and is directed forward of the handle bar;
    said selector switch being mounted through said switch housing to said handle bar.

4. The motorcycle having a transmission according to claim 2, and further comprising a switch housing for accommodating a plurality of switches including said selector switch wherein said selector switch is located in the vicinity of a grip provided on said handle bar and is directed forward of the handle bar;
    said selector switch being mounted through said switch housing to said handle bar.

5. The motorcycle having a transmission according to claim 1, and further including a selector switch housing having a first side disposed toward a rear of the motorcycle and a second side disposed forwardly therefrom, said selector switch being positioned on said second side of said selector switch housing.

6. The motorcycle having a transmission according to claim 5, wherein said selector switch is disposed to be positioned adjacent to a hand grip mounted on the first end of the handle bar for selective actuation thereof.

7. The motorcycle having a transmission according to claim 1, and further including a shift control switch housing having a first side disposed towards a rear of the motorcycle and a second side disposed forwardly therefrom, said shift control switch being positioned on said first side of said shift control switch housing.

8. The motorcycle having a transmission according to claim 7, wherein said shift control switch is a swing type switch adapted to be returned to a neutral position by a spring.

9. The motorcycle having a transmission according to claim 7, wherein said shift control switch is disposed adjacent to a hand grip mounted on a second end of the handle bar for selective actuation thereof.

10. The motorcycle having a transmission according to claim 7, and further including a passing switch being positioned on said second side of said shift control switch housing.

11. A motorcycle having a transmission operated by selecting either an automatic shift mode where a speed ratio is automatically decided according to a rotational speed of a prime mover or a manual shift mode where a speed ratio is decided by a manual operation of an operator, in changing the rotational speed of said prime mover to transmit an output rotation of said prime mover to a drive wheel comprising:
    a plurality of automatic shift modes including a first automatic shift mode and a second automatic shift mode different in shift characteristics from said first automatic shift mode for operating said transmission;
    a selector switch for periodically selecting any one of said plurality of automatic shift modes and said manual shift mode every time said selector switch is operated; and
    a shift control switch having a function as a shift switch when said manual shift mode has been selected by said selector switch;
    said selector switch being mounted on a handle bar of the motorcycle near a first end of said handle bar, whereas said shift control switch is mounted on said handle bar near a second end of the handle bar.

12. The motorcycle having a transmission according to claim 11, and further comprising a switch housing for accommodating a plurality of switches including said selector switch wherein said selector switch is located in the vicinity of a grip provided on said handle bar and is directed forward of the handle bar;
    said selector switch being mounted through said switch housing to said handle bar.

13. The motorcycle having a transmission according to claim 11, and further including a selector switch housing having a first side disposed adjacent towards a rear of the motorcycle and a second side disposed forwardly therefrom, said selector switch being positioned on said second side of said selector switch housing.

14. The motorcycle having a transmission according to claim 13, wherein said selector switch is disposed to be positioned adjacent to a hand grip mounted on the first end of the handle bar for selective actuation thereof.

15. The motorcycle having a transmission according to claim 11, and further including a shift control switch housing having a first side disposed towards a rear of the motorcycle and a second side disposed forwardly therefrom, said shift control switch being positioned on said first side of said shift control switch housing.

16. The motorcycle having a transmission according to claim 15, wherein said shift control switch is a swing type switch adapted to be returned to a neutral position by a spring.

17. The motorcycle having a transmission according to claim 15, wherein said shift control switch is disposed adjacent to a hand grip mounted on a second end of the handle bar for selective actuation thereof.

18. The motorcycle having a transmission according to claim 15, and further including a passing switch being positioned on said second side of said shift control switch housing.

19. The motorcycle having a transmission according to claim 11, and further including an indicator for indicating the actuation of said automatic shift mode or said manual shift mode.

20. The motorcycle having a transmission according to claim 11, wherein said shift control switch functioning as a shift switch includes a shift-up contact and a shift-down contact for changing a gear ratio of said transmission.

21. The motorcycle having a transmission according to claim 1, wherein said selector switch being mounted on the handle bar of the motorcycle near the first end of said handle bar, whereas said shift control switch is mounted on said handle bar near the second end of the handle bar that is opposite to the first end of the handle bar such that when the operator operates the motorcycle, the operator uses one hand to operate the selector switch mounted on the first end of the handle bar and uses the other hand to operate the shift control switch mounted on the second end of the handle bar.

22. The motorcycle having a transmission according to claim 9, wherein said selector switch being mounted on the handle bar of the motorcycle near the first end of said handle bar, whereas said shift control switch is mounted on said handle bar near the second end of the handle bar that is opposite to the first end of the handle bar such that when the operator operates the motorcycle, the operator uses one hand to operate the selector switch mounted on the first end of the handle bar and uses the other hand to operate the shift control switch mounted on the second end of the handle bar.

* * * * *